United States Patent
Melillo

[15] 3,678,834
[45] July 25, 1972

[54] REVERSIBLE FILM CAMERA WITH SELECTABLE EXPOSURE SIZES

[72] Inventor: Dominic S. Melillo, 129 Marmora Road, Parsippany, N.J. 07054

[22] Filed: June 4, 1971

[21] Appl. No.: 149,943

[52] U.S. Cl. ............................ 95/36, 352/80, 352/83, 95/37, 95/31
[51] Int. Cl. ............................................. G03b 17/14
[58] Field of Search .............. 95/31, 36, 37; 352/80, 82, 352/83; 355/54

[56] References Cited

UNITED STATES PATENTS

| | | | |
|---|---|---|---|
| 1,572,863 | 2/1926 | Owens | 352/83 |
| 1,592,910 | 7/1926 | Stewart | 352/83 |
| 3,276,837 | 10/1966 | Kuppenbender | 352/83 |
| 1,109,077 | 9/1936 | Lockyer | 95/36 |

FOREIGN PATENTS OR APPLICATIONS 1,028,002  2/1953  France ........................... 95/36

Primary Examiner—John M. Horan
Attorney—Edward Goldberg

[57] ABSTRACT

A camera and film are adapted to provide an increased number of exposures of selectable sizes. A plurality of fixed aperture internal masks provide selected image frame sizes and permit exposures along two separate rows across the width of the film. The paper film leader and spools are symmetrical to permit reversal of a roll of film after completing the first row of exposures. The roll is then reinserted for successive winding of the second row from the opposite end. External viewing masks of different sizes corresponding to the internal masks are provided. Two separate film advancing controls with automatic stop means may be mounted on opposite sides of the camera to accommodate selection of four different sizes and numbers of exposures. An interchangeable crank handle may be used to engage the winding mechanism from either side to advance the film, and exposure counters on both sides of the camera indicate the advance of each frame along each row of the film corresponding to the selected size.

12 Claims, 13 Drawing Figures

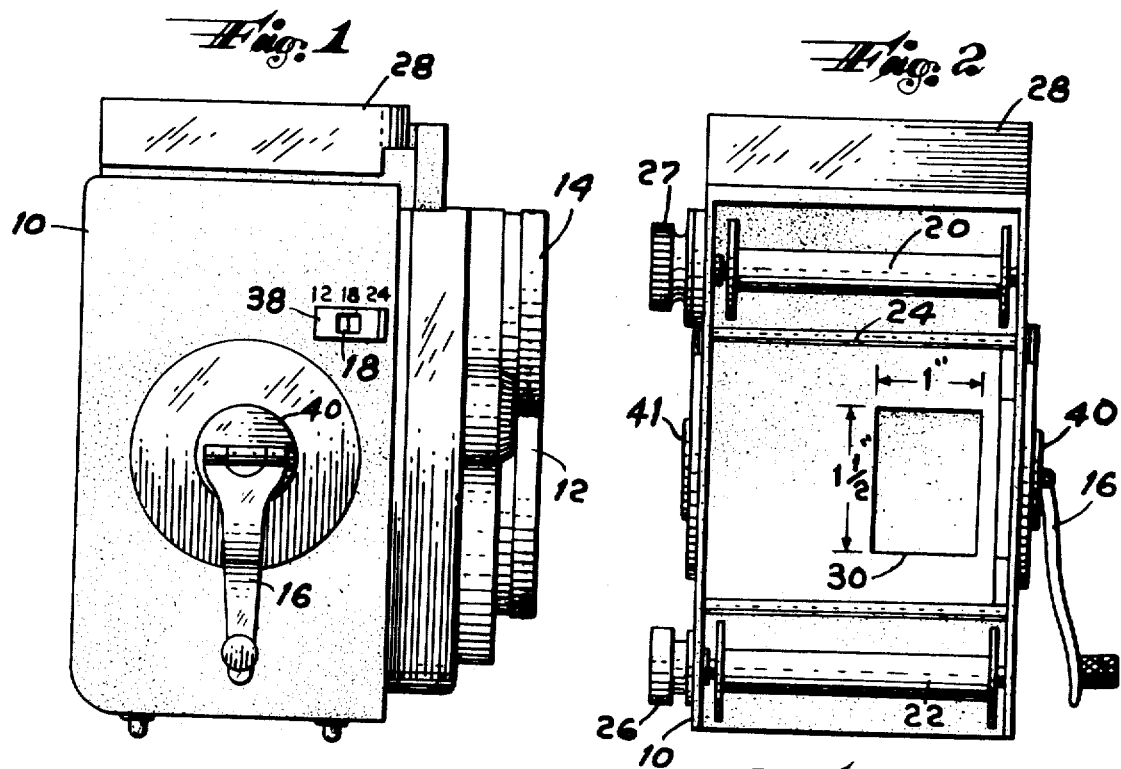
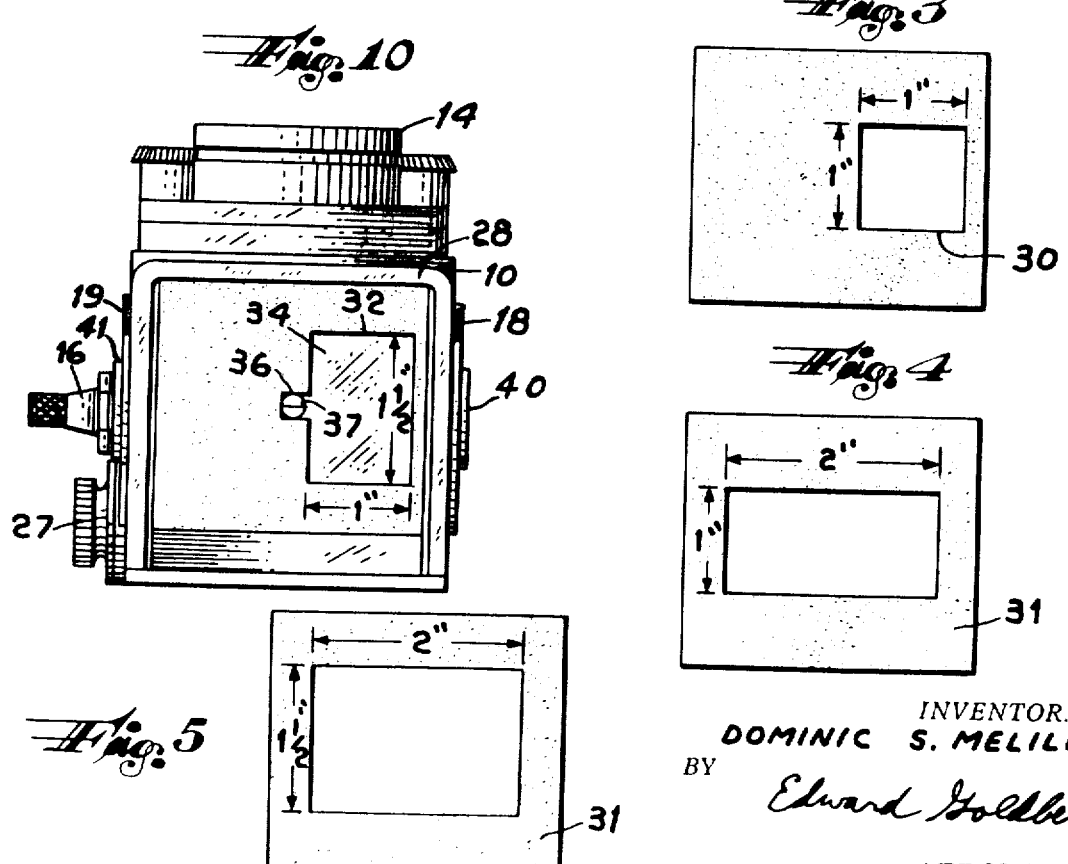

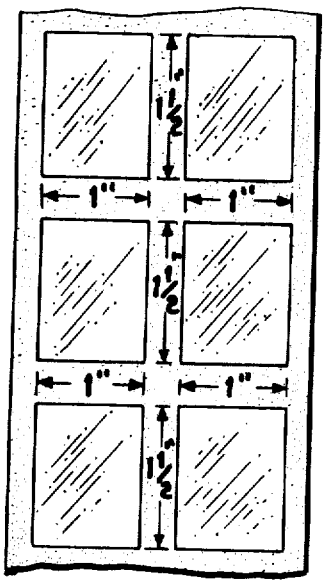
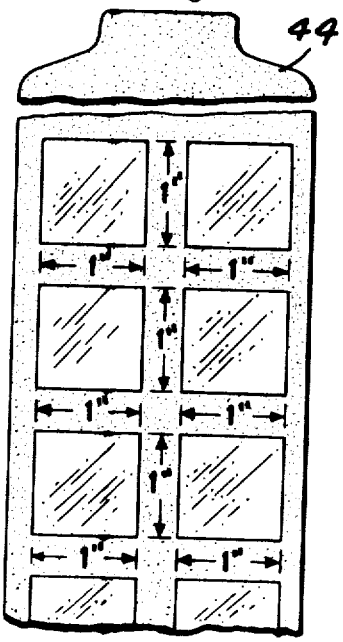
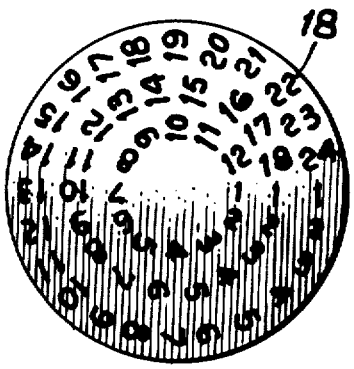
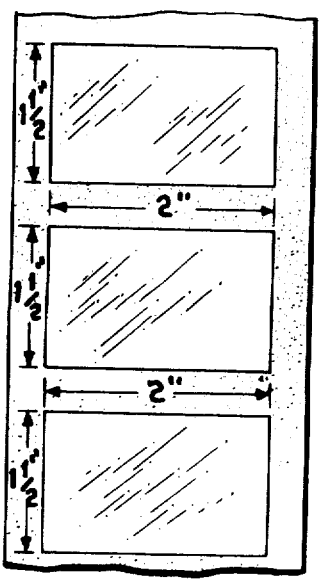
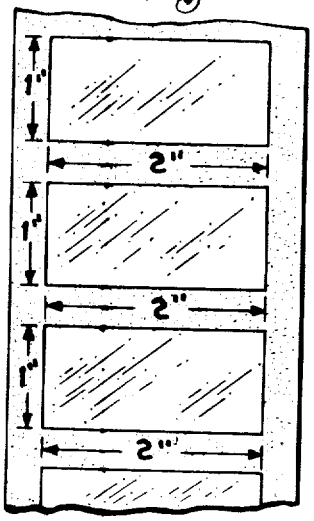
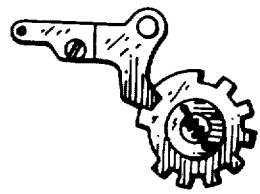
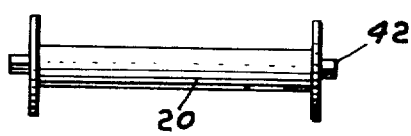
INVENTOR.
DOMINIC S. MELILLO
BY Edward Goldberg
ATTORNEY

REVERSIBLE FILM CAMERA WITH SELECTABLE EXPOSURE SIZES

BACKGROUND OF THE INVENTION

1. Field of the Invention

This invention relates to a manually operated roll film camera which is capable of accommodating greater numbers of exposures of different sizes and particularly to a novel arrangement permitting selectable image frame sizes along two rows of a reversible film strip.

2. Description of the Prior Art

Previous manually operated roll film cameras have utilized different fixed aperture masks to obtain various exposure sizes such as shown in U.S. Pat. No. 2,706,435, issued Apr. 19, 1955, wherein the mask opening is one-half the normal length so that twice the number of exposures may be taken on the same roll of film. The use of continuously variable apertured masks in both the focal plane and view finder were shown in U.S. Pat. No. 2,247,104 issued June 24, 1941, which also incorporates an automatic stop means and shutter release for the film winding mechanism to indicate the ends of the selected portion of the exposing aperture. A further U.S. Pat. No. 3,291,021, issued Dec. 13, 1966, indicates another adjustable movable mask to provide various picture sizes. However, these devices utilized only the full width of the film and the rolls were not reversible to permit two complete rows of exposures to be taken along the two halves of the film width.

Reversible film rolls have been used previously in motion picture cameras, as shown in U.S. Pat. No. 3,355,292, issued Nov. 28, 1967, which has a continuously variable image frame mask and can take two rows of exposures. The masks however are not selectably insertable for use with a manually operated still film camera. U.S. Pat. No. 1,969,484, issued Aug. 7, 1934 and No. 3,008,660 dated Nov. 14, 1961, likewise show reversible film rolls with two rows of motion pictures, but there do not indicate means for obtaining different exposure sizes and numbers. Thus, there is no presently available known manually operated still film camera which can provide selectable exposure sizes along two rows of a reversible film while having means for advancing the film a corresponding length and for indicating the number of each exposure.

SUMMARY OF THE INVENTION

It is therefore the primary object of the present invention to provide a simplified manually operable still film camera which is capable of accommodating selectable image frame sizes on a reversible film roll with two rows of exposures and wherein means are provided for manually advancing the film to correspond with the selected sizes and to indicate the film advance of each frame along each row.

This is accomplished by a novel camera arrangement having a plurality of selectable fixed aperture masks insertable adjacent the focal plane to apply a selected image frame or exposure size to successive portions along the film strip. The film is adapted to accommodate two rows of exposures across the width and the film roll is reversible so that the take-up spool after completion of one row is interchanged with the supply spool and rewound to successively expose the frames along the second row. Means are provided to manually advance the film in accordance with the selected aperture length and to indicate the number of exposures along each row.

Separate viewing masks provide corresponding aperture sizes for the viewing lens. In a preferred embodiment two separate film advancing controls having automatic stop means are mounted on opposite sides to provide four selective exposure sizes and numbers. Additional objects and advantages will become apparent from the following description in conjunction with the accompanying drawings.

BRIEF DESCRIPTION OF THE DRAWINGS

FIG. 1 is a side view of the novel camera showing the film advancing means and exposure indicating means, FIG. 2 is a back view of the camera with the cover removed to show the film spools, two manual film advancing means on opposite sides and an internal aperture mask, FIGS. 3, 4 and 5 show different sized aperture masks, FIGS. 6, 7, 8 and 9 show several film strips having different exposure sizes, FIG. 10 is a top view of the camera showing a viewing mask, FIG. 11 shows the exposure counter for indicating different numbers and sizes of exposures, FIG. 12 shows a portion of a typical film stop mechanism, and FIG. 13 shows a novel film spool which may be employed with the present invention.

DESCRIPTION OF THE PREFERRED EMBODIMENTS

As shown in FIG. 1, a twin lens reflex type camera housing 10 includes a standard taking lens 12 with an internal shutter mechanism, a front viewing lens 14, a manually rotatable film advancing handle or crank 16 and an exposure indicating counter 18. A suitable focusing mechanism, not shown, is also provided but does not form an essential feature of the particular present invention. The film advancing handle is linked in a known manner by gearing to drive the film take-up spool 20, shown in FIG. 2. The film roll in this camera is initially wound on supply spool 22 so that the leading end advances up over the back of the focal plane image frame 24 and is wound onto the take-up spool 20 as handle 16 is turned in a clockwise direction, with both spools likewise rotating clockwise.

The camera is generally loaded by pulling out a spring loaded film spool supporter and removal knob 26 to permit insertion of a full roll of film on spool 22 and/or removal of an empty spool. The knob is then released to snap back in place and hold the new roll in position for rotation about its axis. The empty take-up spool is similarly inserted by pulling out support knob 27 and then releasing it. A pivotable viewing lid or top cover 28 is raised to permit viewing of the scene or object to be photographed by reflection from the front viewing lens via an internal mirror or prism to an upper lens positioned under the top cover. The handle and winding mechanism form a known film transport mechanism including an automatic stop device which advances the film the proper length for each exposure or image frame size and then stops the advance until operation of the shutter mechanism releases the stop to permit continued film advancement after each exposure. Counterclockwise rotation of the handle cocks the shutter before the film is advanced in the clockwise direction.

In the present invention, a plurality of selectable apertured masks 30 are provided which are manually insertable to fit over the image frame portion 24 at the focal plane of the camera so that only a predetermined area of film is exposed when the shutter mechanism is operated and the scene is projected through the taking lens onto the film. By limiting the exposed image frame area to one half the full width of the normal film, as shown by aperture mask 30, all of the succeeding exposures will follow in one row along one side of the film as it is advanced. When the predetermined number of exposures is completed, the film is completely wound onto the take-up spool which is then removed, reversed and interchanged with the empty supply spool. The full roll is thus reinserted in place of the empty spool and becomes the supply spool so that the film is now wound from the opposite end. While the sequence of exposed film portions is reversed from the first row of exposures, the direction of rotation of the roll and the position of the apertured mask is the same so that the opposite half of the film is now exposed in successive lengths to form a complete second row of reduced width images. Thus, twice the standard number of exposures can be accommodated on the same roll of film. Since the usual film roll takes 12 exposures, this would mean doubling the number to accommodate 24 exposures on the two rows.

A further increase in exposures is obtained by utilizing apertured masks of reduced length. Thus, while the standard No.

120 size film roll is made to accept 12 exposures of approximately 2 inches in length by 2 inches in width (2 × 2 inches), by selecting a predetermined shorter fixed length aperture of 1 ½ inches the number of exposures along the film length is increased to 18. In combination with the reduction in width to one half or 1 inch, as already described, two separate rows of 1 ½ inches long by 1 inch wide masked image frame sizes can provide 36 exposures on one film roll. The aperture mask 30 shown in FIG. 2 and the corresponding rows of exposures on film shown partially in FIG. 6 illustrate the use of a 1 ½ × 1 inch aperture and exposure size.

A still further increase in exposures can be obtained with a 1 × 1 inch aperture mask as illustrated in FIG. 3 and FIG. 7, which can provide 24 exposures in each row for a total of 48 on the standard film roll that ordinarily accommodates 12. FIGS. 4 and 5 represent additional apertured masks 31 of 1 × 2 inches and 1 ½ × 2 inches which may be used selectively to provide 24 or 18 exposures along the length of the film roll while using the full width of the film, as shown in FIGS. 8 and 9, without double rows. As shown in FIG. 10, a corresponding plurality of apertured viewing masks 32 are insertable over the upper viewing lens or window 34 so that the photographer may view the same scene that is projected onto the film through the taking lens and focal plane mask. An added central area 36 in the viewing mask permits observation through a center lens portion 37 which may be provided for a split image range finder.

The film winding or advancing handle 16 in conjunction with the exposure counter 18 are used to advance the film the proper length corresponding to the selected aperture mask size. Thus, the exposure counter has three selected scales or indices which are used with respective masks. As illustrated in FIG. 11, the exposure counter disk is rotatable in a counterclockwise direction by suitable gearing in conjunction with the film winding handle, to indicate each exposure or frame number. The inner scale from 1 to 12 will thus indicate the 12 standard 2 × 2 inches exposures along the full length and width of the film without use of any smaller aperture masks. The 1 to 18 scale indicates 18 exposures of 1 ½ × 2 inches using the full film width or 18 exposures of 1 ½ × 1 inch along one half the film width. The same exposure scale is used again when the film is reversed and reinserted to indicate the second row of 18 exposures along the second half of the film width, for a total of 36 exposures on the full roll. The outer 1 to 24 scale is used with the 1 × 2 inches mask to obtain 24 exposures along the full width or with the 1 × 1 inch mask to obtain 24 exposures on each half of the film for a total of 48 exposures along the two rows. By sliding the apertured cover 38 of exposure counter 18 over the selected scale portion corresponding with the selected aperture mask size, each time the film handle is rotated to indicate another exposure number the film will automatically be advanced the proper length for each successive exposure of the selected size to obtain the desired total number of exposures. When two rows of exposures are to be taken, the film is reversed after one row is completed and the process repeated with the exposure scale again set to start from the first position.

In a preferred embodiment, as shown in FIGS. 2 and 10, two separate like film advancing controls 40, 41, including like automatic stop devices and like counters 18, 19, such as the one of FIG. 11, are disposed on opposite sides of the camera housing and each is connected to a respective side of the common spool. An interchangeable handle is adapted to engage controls 40 and 41 and wind the film from either side. The mechanism on each side independently and automatically controls the advance of the film in accordance with two selective exposure sizes having the same exposure length and different widths. By using two different aperture masks with each side, a total of four exposure size selections can be provided with the proper film length metered automatically. Thus, if handle 16 with the controls on the right side is set to advance the film 1 ½ inches in length, both a 1 ½ × 2 inches size exposure and aperture mask and a 1 ½ × 1 inch exposure and mask can be used with the same automatic stop setting to provide either 18 full width exposures or 36 exposures in two rows after reversing the film. The same film handle 16 is inserted into the winding control 41 on the other side which is set for a 1 inch length automatic advance to permit use of a 1 × 2 inches exposure size and mask as well as a 1 × 1 inch exposure and mask. This would provide 24 full width exposures or 48 exposures on two half width rows. Normally one mask, with one side having the handle, is selected to use with an entire roll of film.

A typical automatic stop device incorporated with each film advance control includes a well known ratchet wheel and lever mechanism such as shown in FIG. 12. Further details of these devices can be found in assembly diagrams of commercially available cameras. The film is thus automatically advanced the proper length to accommodate the selected mask and exposure size each time the handle is turned and is then locked in position. After the next snap-shot is taken, the shutter release mechanism then releases the film to permit further film movement by the handle for the next metered length. This also advances the associated exposure counter at the same time to indicate the corresponding number of exposures until the roll is completed.

As shown in FIG. 13, in order to facilitate reversal of the film roll and to permit driving of the roll from either side by the handle, the spools 20,22 may be provided with male coupling extensions 42 which engage corresponding slots in the housing and knobs 26, 27, instead of the usual members extending from the sides into slots in the spool. By using extensions 42 in conjunction with spring loaded slots in the housing, the usual knobs 26, 27 can be entirely eliminated. In addition, the paper leader ends of the film roll which engage the spools, such as end 44 in FIG. 7, are made symmetrical to permit reversal of the supply and take-up spools for winding the film from either end.

It may thus be seen that the present invention provides a camera with a plurality of selectable exposure sizes and numbers wherein the film can be reversed and automatically advanced to correspond with the selected format. While a preferred embodiment has been illustrated and described, it is to be understood that many variations may be made in the particular design and configuration without departing from the scope of the invention as set forth in the appended claims.

What is claimed is:

1. A camera apparatus comprising
 a housing,
 a reversible film supply spool rotatably mounted at one end of said housing, said supply spool being adapted to supply film from said one end and being insertable into the opposite end for taking up film,
 a reversible take-up spool substantially identical and interchangeable with said supply spool and mounted at said opposite end of said housing,
 a reversible film strip having symmetrical ends, said film strip being wound on said supply spool and adapted for winding onto said take-up spool, said strip being disposed to accommodate two adjacent longitudinal rows of exposures, each said row being positioned laterally along one half the width of said strip,
 optical means for admitting and directing an external image onto a portion of said film strip to form an exposure thereon,
 a plurality of individual selectable stationary apertured masks, each mask having a different fixed aperture size and being manually insertable adjacent the focal plane of said camera for exposing successive longitudinal portions of a selected size along each said film row on one half the width of said strip,
 means for manually advancing said film in successive lengths corresponding to the selected exposed film portion size, and
 an exposure counter having a plurality of selectable scales corresponding to each said selected exposed film size for indicating the film advance of each exposed film portion of each row, said reversible film supply spool and take-up spool being adapted to be reversed and interchanged upon completion of a predetermined number of exposures on one film row and winding of the film onto said take-up spool, said take-up spool becoming said supply spool and said supply spool becoming said take-up spool for winding said film from the opposite end to provide the second row of exposures.

2. The camera of claim 1 wherein each said mask includes one aperture disposed in a fixed position over one half the width of said strip for exposing each film row in turn to the selected exposure size.

3. The camera of claim 1 wherein said masks are a plurality of selectable apertured plates mounted in said housing at said focal plane adjacent said film to limit the size of said exposed film portions.

4. The camera of claim 3 wherein said film strip symmetrical ends are adapted for winding onto each spool from each end.

5. The camera of claim 4 wherein said exposure counter includes at least two different exposure counting scales and means for selectively displaying one of said scales.

6. The camera of claim 5 including means for viewing said external image directed onto said film strip and a second plurality of selectable fixed aperture masking means adapted to fit over said viewing means for viewing different selected fixed image sizes corresponding to the size of the selected film portion exposed by said first masking means.

7. The camera of claim 6 wherein said further plurality of masks include an aperture having an extension over a central area of said viewing means.

8. The camera of claim 6 including first and second manual film advancing means disposed on opposite sides of said housing, each film advancing means manually advancing said film in accordance with different respective exposure sizes, and first and second automatic stop means for limiting the advance of respective said first and second advancing means in accordance with the selected exposure sizes, each stop means having a different respective predetermined fixed length film advance limit.

9. The camera of claim 8 wherein each respective advancing means and associated automatic stop means accommodates two exposure sizes of the same length, one size being disposed across substantially the full width of said film strip and the other across one half said width.

10. The camera of claim 8 including means for coupling each side of said take-up and supply spools to respective first and second advancing means to permit each advancing means to drive said spools.

11. The camera of claim 8 including an interchangeable film winding handle selectively engageable with said first and second film advancing means.

12. The camera of claim 8 including first and second exposure counters disposed on said opposite sides for indicating the respective film advance of said first and second film advancing means.

* * * * *